United States Patent
Zhou et al.

(10) Patent No.: US 11,686,666 B2
(45) Date of Patent: Jun. 27, 2023

(54) METHOD FOR DETECTING MICROSTRUCTURE OF FUNCTIONALLY GRADED MATERIAL BASED ON DIGITAL ACOUSTO-OPTIC HOLOGRAPHY

(71) Applicant: Shanghai University, Shanghai (CN)

(72) Inventors: Wenjing Zhou, Shanghai (CN);
Guangcai Huang, Shanghai (CN);
Yingjie Yu, Shanghai (CN); Shili Liu,
Shanghai (CN); Hongxia Shen,
Shanghai (CN)

(73) Assignee: SHANGHAI UNIVERSITY, Shanghai (CN)

(*) Notice: Subject to any disclaimer, the term of this patent is extended or adjusted under 35 U.S.C. 154(b) by 0 days.

(21) Appl. No.: 17/047,651

(22) PCT Filed: Dec. 18, 2019

(86) PCT No.: PCT/CN2019/126427
§ 371 (c)(1),
(2) Date: Oct. 14, 2020

(87) PCT Pub. No.: WO2021/097987
PCT Pub. Date: May 27, 2021

(65) Prior Publication Data
US 2023/0110517 A1  Apr. 13, 2023

(30) Foreign Application Priority Data
Nov. 21, 2019 (CN) .......................... 201911150327.6

(51) Int. Cl.
*G01N 21/17* (2006.01)
*G03H 3/00* (2006.01)
(Continued)

(52) U.S. Cl.
CPC ....... *G01N 21/1702* (2013.01); *G03H 1/0005* (2013.01); *G03H 1/0443* (2013.01);
(Continued)

(58) Field of Classification Search
CPC .......... G01N 21/1702; G01N 21/1706; G01N 2201/0636; G03H 1/0005; G03H 1/0443;
(Continued)

(56) References Cited

U.S. PATENT DOCUMENTS 9,651,364 B2 * 5/2017 Reitinger ............... G01B 11/14
9,995,674 B2 * 6/2018 Prasad ................... G01N 29/46
(Continued)

FOREIGN PATENT DOCUMENTS

| CN | 101055265 A | 10/2007 |
|----|-------------|---------|
| CN | 102290060 A | 12/2011 |
| CN | 106019913 A | 10/2016 |

*Primary Examiner* — Suman K Nath

(57) ABSTRACT

The present invention discloses a method for detecting a microstructure of a functionally graded material based on digital acousto-optic holography, including the following steps: excite a sample with an ultrasonic wave; record a light wave; form a single tomographic acousto-optic hologram; perform numerical reconstruction of phase information, and perform global detection. The present invention uses an acoustic-optic modulation device to modulate a laser light source of a laser of a laser device to form two light waves of different frequencies. The two light waves each constitute a Mach-Zehnder interference system to record reflection wave information and transmission wave information of an ultrasound, and are finally combined and recorded in the same hologram to form the single tomographic acousto-optic hologram.

5 Claims, 1 Drawing Sheet

(51) Int. Cl.
*G03H 1/04* (2006.01)
*G03H 1/00* (2006.01)

(52) U.S. Cl.
CPC ....... *G03H 3/00* (2013.01); *G01N 2021/1706* (2013.01); *G01N 2201/0636* (2013.01); *G03H 2001/005* (2013.01); *G03H 2210/55* (2013.01); *G03H 2223/24* (2013.01); *G03H 2226/02* (2013.01); *G03H 2226/11* (2013.01)

(58) Field of Classification Search
CPC ............... G03H 3/00; G03H 2001/005; G03H 2210/55; G03H 2223/24; G03H 2226/02; G03H 2226/11
See application file for complete search history.

(56) References Cited

U.S. PATENT DOCUMENTS 10,386,171 B1 * 8/2019 Perea .................. G01B 9/02041
2005/0237533 A1 * 10/2005 Lal ........................... G01H 9/00
356/486

* cited by examiner

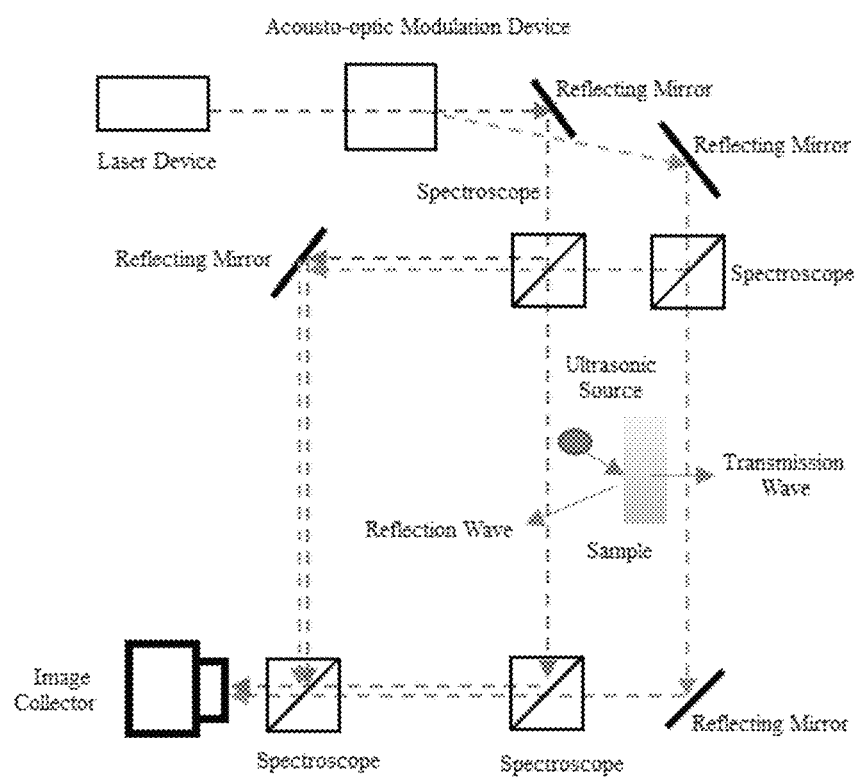

METHOD FOR DETECTING MICROSTRUCTURE OF FUNCTIONALLY GRADED MATERIAL BASED ON DIGITAL ACOUSTO-OPTIC HOLOGRAPHY

FIELD OF THE INVENTION

The present invention relates to the field of a method for detecting a material, in particular to a method for detecting a microstructure of a functionally graded material based on digital acousto-optic holography.

BACKGROUND OF THE INVENTION

A functionally graded material is a novel composite material that combines various components (such as metal, ceramic, fiber, polymer, and so on), and whose structure and physical parameter, as well as physical property, chemical property, biological property, and other single or composite properties are all changed continuously to adapt to different environments and extreme circumstances (such as an ultra-high temperature, a large temperature difference and so on), so as to realize a special function;

In the prior art, there is no a method that can realize the global detection of a microstructure inside the functionally graded material. Even if there is a plurality of methods for other materials, for the functionally graded material, the methods still have problems such as mutual interference of detection information and insufficient integrity of information record, and have a problem that the resolution of the microstructure and the gradient resolution of the material cannot meet detection requirements. Therefore, the present invention proposes a method for detecting the microstructure of the functionally graded material based on digital acousto-optic holography to solve the problems in the prior art.

SUMMARY OF THE INVENTION

In view of the above problems, the present invention proposes a method for detecting a microstructure of a functionally graded material based on digital acousto-optic holography. The method uses an acoustic-optic modulation device to modulate a laser light source of a laser of a laser device to form two light waves of different frequencies. The two light waves each constitute a Mach-Zehnder interference system to record reflection wave information and transmission wave information of an ultrasound, and are finally combined and recorded in the same hologram to form a single tomographic acousto-optic hologram. A reflection-transmission dual-mode interference optical path is beneficial to avoiding the mutual interference of the reflection wave information and the transmission wave information, and being able to improve the integrity of information record and information redundancy by using time delay integration with point sensing and surface output to scan CCD through an image collector and cooperate with a synchronous control system to perform surface scanning and record for information of an ultrasound carrier, which finally realizes the global detection of the microstructure inside the functionally graded material. The resolution of the microstructure of the material can reach a submicron magnitude, and the gradient resolution thereof can reach a nanometer magnitude, which can meet the needs of the structure detection of most materials.

In order to solve the above problems, the present invention proposes the method for detecting the microstructure of the functionally graded material based on the digital acousto-optic holography, comprising the following steps:

Step 1: excite a sample with an ultrasonic wave

Use an independent ultrasonic wave to excite the tested functionally graded material, utilize the ultrasonic wave to carry internal gradient information of the material to be propagated and output, and convert a non-transparent material into a "transparent" material in a visible light waveband through acoustic wave excitation and a carrier wave;

Step 2: record a light wave

After the ultrasonic wave carries the internal gradient information of the material to be propagated and output, form a reflection wave and a transmission wave, and then use an acousto-optic modulation device to modulate a laser light source of a laser of a laser device to form two light waves of different frequencies, wherein the two light waves of different frequencies records reflection wave information and transmission wave information of the ultrasonic wave through the refraction of a reflecting mirror and a spectroscope, respectively;

Step 3: form a single tomographic acousto-optic hologram

Refract the light wave recorded with the reflection wave by the spectroscope again, and refract the light wave recorded with the transmission wave by the reflecting mirror and the spectroscope again, wherein the light waves are finally combined and recorded in the same hologram in an image collector by the spectroscope to form a single tomographic acousto-optic hologram;

Step 4: perform numerical reconstruction of phase information

Use different wavelengths and different reconstruction distances in an optic hologram to separate the reflection wave information and the transmission wave information, and realize the demodulation of ultrasonic wave information;

Step 5: perform global detection

According to demodulated ultrasonic wave information, combine with a sound field theory, perform quantitative mapping to obtain the gradient information of the material, and finally realize the global detection of the microstructure inside the functionally graded material.

Further improvement lies in: in Step 3, the image collector adopts time delay integration with point sensing and surface output to scan CCD or one of area array sensing CCDs, and cooperate with a synchronous control system to perform surface scanning and record for information of an ultrasonic carrier.

Further improvement lies in: in Step 5, the resolution of the microstructure of the material reaches a submicron magnitude, and the gradient resolution thereof reaches a nanometer magnitude.

A system for detecting a microstructure of a functionally graded material based on digital acousto-optic holography comprises a sample of the functionally graded material, an ultrasonic source, a laser device, an acousto-optic modulation device, an image collector, a spectroscope, and a reflecting mirror, wherein there is a plurality of sets of the spectroscopes and the reflecting mirrors. The ultrasonic source transmits the sample of the functionally graded material and carries internal gradient information of the material to form reflection wave output and transmission wave output. The laser device passes through the acousto-optic modulation device to form two beams of light waves. The frequencies of the two light waves are different. The first beam of the light wave is refracted by a first group of the reflecting mirrors and a first group of the spectroscopes to converge with a reflection wave. The second beam of the light wave is refracted by a second group of the reflecting mirrors and a second group of the spectroscopes to converge with the transmission wave. The first beam of the light wave passes through a third group of the spectroscopes and a fourth group of the spectroscopes and reaches the image collector again. The second beam of the light wave passes through a third group of the reflecting mirrors, the third group of the spectroscopes and the fourth group of the spectroscopes again and reaches the image collector.

Further improvement lies in: the first group of the spectroscopes and the second group of the spectroscopes refract a residual wave refracted out by the first beam of the light wave and the second beam of the light wave by the fourth group of the reflecting mirrors to the fourth group of spectroscopes.

The present invention has the following beneficial effects: the present invention uses the acoustic-optic modulation device to modulate the laser light source of the laser of the laser device to form two light waves of different frequencies. The two light waves each constitute a Mach-Zehnder interference system to record the reflection wave information and the transmission wave information of the ultrasound, and are finally combined and recorded in the same hologram to form the single tomographic acousto-optic hologram. The reflection-transmission dual-mode interference optical path is beneficial to avoiding the mutual interference of the reflection wave information and the transmission wave information, and being able to improve the integrity of the information record and the information redundancy by using the time delay integration with the point sensing and the surface output to scan the CCD through the image collector and cooperate with the synchronous control system to perform surface scanning and record for the information of the ultrasound carrier, which finally realizes the global detection of the microstructure inside the functionally graded material. The resolution of the microstructure of the material can reach the submicron magnitude, and the gradient resolution thereof can reach the nanometer magnitude, which can meet the needs of the structure detection of most materials. In addition, a digital hologram record optical system in the research of the present invention is simple and has no special requirements for the preparation for the material. There is no need for stress or temperature or other additional methods to load during a detection process for the material, and the research results can be extended to the global detection of internal nonlinear change parameters of other non-uniform materials, so as to provide an intuitive theoretical basis for the design, preparation, and performance evaluation of the material, which has good academic research significance and application value.

BRIEF DESCRIPTION OF THE DRAWINGS

FIG. 1 is a flowchart of the present invention.

DETAILED DESCRIPTION OF THE INVENTION

In order to make the technical means, the purpose and the effect of the invention easy to understand, the present invention will be further explained below in conjunction with specific embodiments.

As shown in FIG. 1, the present embodiment provides a method for detecting a microstructure of a functionally graded material based on digital acousto-optic holography, comprising the specific steps as follows:

Step 1: excite a sample with an ultrasonic wave

Use an independent ultrasonic wave to excite the tested functionally graded material, utilize the ultrasonic wave to carry internal gradient information of the material to be propagated and output, and convert a non-transparent material into a "transparent" material in a visible light waveband through acoustic wave excitation and a carrier wave;

Step 2: record a light wave

After the ultrasonic wave carries the internal gradient information of the material to be propagated and output, form a reflection wave and a transmission wave, and then use an acousto-optic modulation device to modulate a laser light source of a laser of a laser device to form two light waves of different frequencies, wherein the two light waves of different frequencies records reflection wave information and transmission wave information of the ultrasonic wave through the refraction of a reflecting mirror and a spectroscope, respectively;

Step 3: form a single tomographic acousto-optic hologram

Refract the light wave recorded with the reflection wave by the spectroscope again, and refract the light wave recorded with the transmission wave by the reflecting mirror and the spectroscope again, wherein the light waves are finally combined and recorded in the same hologram in an image collector by the spectroscope to form a single tomographic acousto-optic hologram, wherein the image collector adopts time delay integration with point sensing and surface output to scan CCD, and cooperates with a synchronous control system to perform surface scanning and record for information of an ultrasonic carrier, improving the integrity of information record and information redundancy, and forming a single tomographic acousto-optic hologram;

Step 4: perform numerical reconstruction of phase information

Use different wavelengths and different reconstruction distances in an optic hologram to separate the reflection wave information and the transmission wave information, and realize the demodulation of ultrasonic wave information;

Step 5: perform global detection

According to demodulated ultrasonic wave information, combine with a sound field theory, perform quantitative mapping to obtain the gradient information of the material, and finally realize the global detection of the microstructure inside the functionally graded material, wherein the resolution of the microstructure of the material reaches a submicron magnitude, and the gradient resolution thereof reaches a nanometer magnitude, which can meet the needs of the structure detection of most materials.

A system for detecting a microstructure of a functionally graded material based on digital acousto-optic holography comprises a sample of the functionally graded material, an ultrasonic source, a laser device, an acousto-optic modulation device, an image collector, a spectroscope, and a reflecting mirror, wherein there is a plurality of sets of the spectroscopes and the reflecting mirrors. The ultrasonic source transmits the sample of the functionally graded material and carries internal gradient information of the material to form reflection wave output and transmission wave output. The laser device passes through the acousto-optic modulation device to form two beams of light waves. The frequencies of the two light waves are different. A reflection-transmission dual-mode interference optical path system is constructed to realize the record of a single acousto-optic tomography hologram, and avoid the mutual interference of reflection wave information and transmission wave information. The first beam of the light wave is refracted by a first group of the reflecting mirrors and a first group of the spectroscopes to converge with a reflection wave, the second beam of the light wave is refracted by a second group of the reflecting mirrors and a second group of the spectroscopes to converge with the transmission wave. The two light waves each constitute a Mach-Zehnder interference system to record the reflection wave information and the transmission wave information of an ultrasound. The first beam of the light wave passes through a third group of the spectroscopes and a fourth group of the spectroscopes and reaches the image collector again. The second beam of the light wave passes through a third group of the reflecting mirrors, the third group of the spectroscopes and the fourth group of the spectroscopes again and reaches the image collector.

The first group of the spectroscopes and the second group of the spectroscopes refract a residual wave refracted out by the first beam of the light wave and the second beam of the light wave by the fourth group of the reflecting mirrors to the fourth group of spectroscopes.

The present invention uses the acoustic-optic modulation device to modulate the laser light source of the laser to form two beams of light waves of different frequencies. The two light waves each constitute a Mach-Zehnder interference system to record the ultrasonic reflection wave information and the transmission wave information of the ultrasound, and are finally combined and recorded in the same hologram to form the single tomographic acousto-optic hologram. The reflection-transmission dual-mode interference optical path is beneficial to avoiding the mutual interference of the reflection wave information and the transmission wave information, and being able to improve the integrity of the information record and the information redundancy by using the time delay integration with the point sensing and the surface output to scan the CCD through the image collector and cooperate with the synchronous control system to perform surface scanning and record for the information of the ultrasound carrier, which finally realizes the global detection of the microstructure inside the functionally graded material. The resolution of the microstructure of the material can reach the submicron magnitude, and the gradient resolution thereof can reach the nanometer magnitude, which can meet the needs of the structure detection of most materials. In addition, a digital hologram record optical system in the research of the present invention is simple and has no special requirements for the preparation for the material. There is no need for stress or temperature or other additional methods to load during a detection process for the material, and the research results can be extended to the global detection of internal nonlinear change parameters of other non-uniform materials, so as to provide an intuitive theoretical basis for the design, preparation, and performance evaluation of the material, which has good academic research significance and application value.

The basic principles, main characteristics and advantages of the present invention are shown and described in the above. The person skilled in the art should understand that the present invention is not limited by the above embodiments, that what is described in the above embodiments and specification is merely an illustration of the principles of the invention. Without departing from the spirit and scope of the present invention, the present invention will have various changes and improvements. These changes and improvements all fall within the scope of the claimed invention. The scope claimed by the present invention is defined by the appended claims and the equivalents thereof.

The invention claimed is:
1. A method for detecting a microstructure of a functionally graded material based on digital acousto-optic holography, comprising the following steps:
Step 1: excite a sample with an ultrasonic wave
Use an independent ultrasonic wave to excite a tested functionally graded material, utilize the ultrasonic wave to carry internal gradient information of the material to be propagated and output;
Step 2: record a light wave
After the ultrasonic wave carries the internal gradient information of the material to be propagated and output, form a reflection wave and a transmission wave, and then use an acousto-optic modulation device to modulate a laser light source of a laser of a laser device to form two light waves of different frequencies, wherein the two light waves of different frequencies record reflection wave information and transmission wave information of the ultrasonic wave through the reflection and the refraction of a reflecting mirror and a spectroscope, respectively;
Step 3: form a single tomographic acousto-optic hologram
Refract the light wave recorded with the reflection wave by the spectroscope again, and refract the light wave recorded with the transmission wave by the reflecting mirror and the spectroscope again, wherein the light waves are finally combined and recorded in the same hologram in an image collector by the spectroscope to form a single tomographic acousto-optic hologram;
Step 4: perform numerical reconstruction of phase information
Use different wavelengths and different reconstruction distances in an optic hologram to separate the reflection wave information and the transmission wave information, and realize the demodulation of ultrasonic wave information;
Step 5: perform global detection
According to demodulated ultrasonic wave information, combine with a sound field theory, perform quantitative mapping to obtain the gradient information of the material, and finally realize the global detection of the microstructure inside the functionally graded material.

2. The method for detecting the microstructure of the functionally graded material based on the digital acousto-optic holography according to claim 1, wherein in Step 3, the image collector adopts time delay integration with point sensing and surface output to scan CCD or one of area array sensing CCDs, and cooperate with a synchronous control system to perform surface scanning and record for information of an ultrasonic carrier.

3. The method for detecting the microstructure of the functionally graded material based on the digital acousto-optic holography according to claim 1, wherein in Step 5, the resolution of the microstructure of the material reaches a submicron magnitude, and the gradient resolution thereof reaches a nanometer magnitude.

4. A system for detecting a microstructure of a functionally graded material based on digital acousto-optic holography, comprising: a sample of the functionally graded material, an ultrasonic source, a laser device, an acousto-optic modulation device, an image collector, a spectroscope, and a reflecting mirror, wherein there is a plurality of sets of the spectroscopes and the reflecting mirrors, the ultrasonic source transmits the sample of the functionally graded material and carries internal gradient information of the material to form reflection wave output and transmission wave output, the laser device passes through the acousto-optic modulation device to form two beams of light waves, the frequencies of the two light waves are different, the first beam of the light wave is refracted by a first group of the reflecting mirrors and a first group of the spectroscopes to converge with a reflection wave, the second beam of the light wave is refracted by a second group of the reflecting mirrors and a second group of the spectroscopes to converge with the transmission wave, the first beam of the light wave passes through a third group of the spectroscopes and a fourth group of the spectroscopes and reaches the image collector again, the second beam of the light wave passes through a third group of the reflecting mirrors, the third group of the spectroscopes and the fourth group of the spectroscopes again and reaches the image collector;

wherein the two beams of light waves of different frequencies records reflection wave output information and transmission wave output information of the ultrasonic wave through the reflection and refraction of the reflecting mirror and a spectroscope, respectively.

5. The system for detecting the microstructure of the functionally graded material based on the digital acousto-optic holography according to claim 4, wherein the first group of the spectroscopes and the second group of the spectroscopes refract a residual wave refracted out by the first beam of the light wave and the second beam of the light wave by the fourth group of the reflecting mirrors to the fourth group of spectroscopes.

\* \* \* \* \*